United States Patent Office 2,716,090
Patented Aug. 23, 1955

2,716,090

PLASTICIZING AGENT FOR MINERAL OIL SOLUTIONS

Niilo V. Hakala, Rahway and James E. J. Kane, Elizabeth, N. J., assignors to Esso Research and Engineering Company, a corporation of Delaware No Drawing. Application August 30, 1950,
Serial No. 182,419

9 Claims. (Cl. 252—42.7)

This invention relates to an improved process for preparing lubricating oil compositions containing metal salts of phenol sulfides and to an oxidation inhibiting agent for such compositions.

The invention relates more particularly to an improved process for preparing mineral oil compositions in which the metal salt of the phenol sulfide is prepared directly in solution in the lubricating oil medium in which it is to be used. Means for preparing such agents in a lubricating oil medium have been proposed. For example, in U. S. Patent No. 2,294,145 a process is described in which an alkylated phenol sulfide is neutralized with a basic acting material such as barium hydroxide in a lubricating oil medium, with the employment of a higher fatty alcohol as a plasticizer to reduce the viscosity of the solution and as a foam suppressor. The plasticizer employed does not in itself improve the oxidation resisting properties of the resulting oil solution or of lubricating oils in which the more concentrated solution is blended.

In accordance with the present invention an alkylated phenol containing at least two branched chain groups of 5 to 16 carbon atoms each is employed as the plasticizer and foam suppressor in place of the fatty alcohol. It has been found that the alkylated phenol is not only substantially as effective in plasticizing and foam suppressing properties as the fatty alcohol, but in addition it exerts a substantial oxidation inhibiting effect upon the oil in which the plasticizer is used and upon the finished lubricant in which the concentrated solution of the salt of the phenol sulfide is blended.

As employed in connection with the present invention, the term "metal salt of a phenol sulfide" refers to any metal salt, whether neutral or basic, of a compound of the general formula

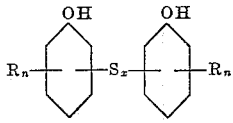

or a polymeric form of such a compound, where R is an alkyl radical, $n$ and $x$ are each integers from 1 to 4, and the total number of carbon atoms in all of the R groups is at least 10 in order to insure adequate solubility in oil of the metal salts. The individual R groups may each contain from 1 to 30 carbon atoms.

The phenol sulfides may be prepared by well known means, for example, by reacting an alkylated phenol with sulfur monochloride or sulfur dichloride. With either of these reagents, a mixture of the phenol monosulfide and phenol disulfide is generally produced. Suitable processes for conducting this reaction are described in U. S. Patent No. 2,139,321.

The alkylated phenol from which the phenol sulfide is prepared is obtained by known alkylation processes, the phenol being reacted with such alkylating agents as isobutylene, isoamylene, diisobutylene, triisobutylene, etc., or olefin-containing mixtures obtained from refinery gases. Boron trifluoride is a preferred alkylating agent.

Among the phenol sulfides which are more preferably employed in the process of the present invention may be mentioned the sulfides of tert.-amyl-phenol, isohexyl phenol, tetra.-octyl phenol, di-tert.-butyl phenol, di-tert.-octyl phenol, waxy-alkylated phenols, and the like.

In the process of the present invention a phenol sulfide is heated with a basic acting metal compound in a mineral oil medium. The metal compound may be any basic acting compound, such as an oxide, hydroxide, carbonate, or the like, of any metal. The process is especially adapted to the preparation of alkaline earth metal salts, but other metal salts such as those of zinc, aluminum, tin, manganese, iron, cobalt and nickel may similarly be prepared. The process is conducted by dissolving the phenol sulfide in a mineral lubricating oil base, preferably having a viscosity (Saybolt) of about 35 to 85 seconds at 210° F. The solution is agitated and heated to a temperature of 200–250° F. whereupon the metal basic acting compound is added gradually, the mixture being blown with an inert gas such as nitrogen to remove the water formed in the reaction. Without the use of a plasticizer, serious foaming of the mixture may be encountered and the solution tends to become quite viscous. With the alkylated phenol plasticizer of the present invention, however, the foam is much less and the viscosity of the solution is greatly reduced, permitting the addition of the full amount of the metal compound required for neutralization, or more than this amount if a basic salt is to be formed. The concentration of the plasticizer in the mineral oil vehicle used for the process of this invention is in general proportional to the amount of reagents used. For example, in preparing a 25 to 50% by weight concentrate of the desired salt, concentrations of about 4 to 20% by weight of the alkylated phenol are effective to suppress foaming in the reaction and to reduce the viscosity and increase the ease of handling of the product.

The mineral oil used as the reaction medium and to dissolve the metal salt products should have a boiling point somewhat higher than the temperature of the reaction, mineral lubricating oils of proper flash point and viscosity for the intended lubricating use being preferably employed. Where it is desired to blend the resulting concentrate with motor oil the viscosity of the mineral oil reaction vehicle should be above about 35–45 seconds (Saybolt) at 210° F., in order that the addition of the resulting product concentrate to a mineral motor lubricating oil base stock will not materially lower the flash point of the oil.

The alkylated phenols which are employed in the capacity of plasticizing agents and antioxidants in the process and compositions of the present invention are phenols containing at least two branched chain alkyl side chains, each containing from 5 to 16 carbon atoms. While the tertiary alkyl groups are preferred, secondary groups are also effective. While dialkyl phenols are preferred, trialkyl and other polyalkyl phenols may be employed, and such higher alkylated phenols may contain either straight or branched chain groups, provided only that the minimum of two branched chain groups is present. Di-tert.-octylphenol is a useful example of such an alkylated phenol, since it is produced as a by-product in the manufacture of tert.-octylphenol which is employed in the manufacture of tert.-octylphenol sulfide, whose metal salts are well known as detergents and corrosion inhibitors for lubricating oils. In the preparation of tert.-octylphenol by the alkylation of phenol with diisobutylene a phenolic mixture is produced containing both tert.-octylphenol and di-tert.-octylphenol, and the latter may be separated by distillation within the range 180–220° C. at 20 mm. pressure. Thus, di-tert.-octylphenol may be produced conveniently and economically during the course of the manufacture of the calcium or barium salts of tert.-octylphenol sulfide and it serves a double function as plasticizer for the neutralization reaction and as antioxidant to reinforce the corrosion inhibiting properties of the lubricant in which the metal salt is employed. Other examples of suitable alkylated phenols include diisoamylphenol, di-tert.-amylphenol, isoamyl-tert.-octylphenol, tri-tert.-octylphenol, di-tert.-dodecylphenol, di-tert.-hexadecylphenol, diisoamyl-n-butylphenol, and the like. Compounds of these types and mixtures of such compounds may be prepared by employing polymers and copolymers of various olefins, such as the dimers, trimers and tetramers of propylene, butylenes, etc., as the alkylating agents for the phenols, and such products may be employed for the purposes of the present invention.

When the alkylated phenol is employed as plasticizer in the neutralization reaction described above and in the amounts disclosed, this compound remains in the resulting concentrated oil solution of the metal salt and becomes blended with the base lubricating oil in which the salt concentrate is blended and exerts an antioxidant and corrosion resisting effect in the final lubricant product. If desired, additional amounts of the alkylated phenol may be added to the lubricant for additional antioxidant effect. Generally, for the most desirable effects, the lubricant should contain about 0.5 to 5.0% by weight of the metal salt of the phenol sulfide and 0.1 to 2.5% by weight of the alkylated phenol.

In the following examples there will be described in detail various preparations and tests of metal salt concentrates in accordance with the present invention, but these examples are not to be considered as limiting the scope of the invention in any manner.

*Example 1.—Preparation of di-tert.-octylphenol*

A commercial batch of tert.-octylphenol (to be used in the preparation of tert.-octylphenol sulfide) was prepared by contacting 600 lbs. (6.4 mols) of phenol with 785 lbs. (7.0 mols) of diisobutylene (made by the "cold acid" polymerization of isobutylene at 25–35° C. for 2 hours in the presence of 0.67% BF₃, based on the phenol used. The resulting product consists of 70–80% tert.-octylphenol, 10–20% di-tert.-octylphenol and higher alkylated phenols, and a small amount of low boiling products. A fraction of this material consisting of a major proportion of di-tert.-octylphenol and a minor proportion of higher alkylated phenols was obtained by distilling at 180–220° C. at 20 mm. pressure.

*Example 2,—Laboratory plasticizer test*

In order to determine the effect of the alkylated phenols in the present invention in reducing the viscosity of a concentrated solution of a lubricating oil solution of a metal salt of an alkylated phenol sulfide, 40% concentrates of the barium salt of tert.-octylphenol sulfide in a lubricating oil base were prepared, without the use of any plasticizer and with the use of "Lorol B" alcohol (a commercial mixture of C$_{10}$ to C$_{18}$ primary aliphatic alcohols derived from coconut oil) and di-tert.-octylphenol (the distillation product of Example 1), respectively, as plasticizers. The method employed in preparing the blends of the barium salt was as follows:

In the preparation of the 40% concentrate of barium tert.-octylphenol sulfide with no plasticizer, 145 grams of tert.-octylphenol sulfide (containing an average of 1.74 atoms of sulfur for each 2 phenolic groups) was dissolved in a sufficient amount of an extracted Mid-continent lubricating oil of about 45 seconds viscosity (Saybolt) at 210° F. to give a 37 weight percent solution, to which was added two drops of silicone polymer. This blend was heated to 120–125° C. and 113 grams of barium octahydrate was added, while stirring, over a 1-hour period. This mixture was then held at 120–125° C. for an additional hour. Following this, the blend was heated to 135° C., 110 grams of a filter aid (Hy-flo) was added, the temperature raised to 150° C., and the product filtered.

The preparations of the concentrates with Lorol B alcohol and di-tert.-octylphenol as plasticizers were carried out in a manner similar to that described above, with the exception that 27 grams of Lorol B alcohol, in one case, and the same amount of di-tert.-octylphenol, in the other case, was added to the 37 weight percent solution of tert.-octylphenol sulfide in oil prior to heating this solution and the addition of the barium octahydrate. This resulted in a concentration of about 6% by weight of the plasticizer in the finished concentrate.

The resulting oil solutions of barium salts prepared as described above were tested for viscosity and barium content, the results being shown in the following table:

| Plasticizer | Vis./100° F. (Saybolt) | Vis./210° F. (Saybolt) | Barium Content of Solution, Percent |
|---|---|---|---|
| None | 18,500 | 393 | 10.3 |
| Lorol B alcohol | 4,375 | 190 | 9.7 |
| Di-tert.-octylphenol | 7,025 | 207 | 9.6 |

*Example 3.—Chevrolet engine test*

Engine tests were conducted to show the effect of the addition of a small amount of di-tert.-octylphenol to a lubricating oil containing an amount of the barium salt of tert.-octylphenol sulfide normally employed for detergent and bearing corrosion inhibiting purposes. One blend consisted of an extracted Mid-continent oil of 67 viscosity (Saybolt) at 210° F. to which had been added 0.5 weight percent of calcium petroleum sulfonate and 1.1 weight percent of the barium phenol sulfide salt as a concentrate in oil, such concentrate also containing about 6% by weight of Lorol B alcohol corresponding to about 0.2% of the alcohol in the final blend, while in the second blend the same base oil was employed containing the sulfonate, detergent-inhibitor and Lorol B alcohol in the same amounts, and in addition 0.4% by weight of di-tert.-octylphenol (distillation product of Example 1) was added. The test was conducted for a period of 36 hours in a Chevrolet engine, which was operated at 30 brake horsepower, 3150 R. P. M. speed, 280° F. oil temperature, and 200° F. jacket outlet temperature. The oils were rated by a demerit system, wherein a perfectly clean surface was given a rating of 0, while a rating of 10 was given to the worst condition which could be expected on that surface. The corrosion inhibiting effect was determined by noting the loss in weight or the copper-lead bearing during each test. The results are shown in the following table:

| Additive | Engine Demerits | | | Cu-Pb Bearing, Wt. Loss (Gm./Brg.) |
|---|---|---|---|---|
| | Overall | Ring Zone | Varnish | |
| 0.5% Calcium petroleum sulfonate 1.1% Barium tert.-octylphenol sulfide 0.2% Lorol B Alcohol | 0.33 | 0.52 | 0.48 | 0.59 |
| Same +0.4 weight percent ditert.-octylphenol | 0.27 | 0.33 | 0.25 | 0.25 |

The dialkylated phenols of the present invention may be employed not only in ordinary hydrocarbon lubricating oils but also in the "heavy duty" type of lubricating oils which have been compounded with such detergent type additives as metal soaps, metal petroleum sulfonates, metal phenates, metal alcoholates, metal salts of organo-substituted acids of phosphorus, the reaction products of metal phenates and metal phenol sulfides with sulfur and sulfides of phosphorus, and the like. In addition to the above, there may be present other agents such as sludge dispersers, antioxidants, thickeners, viscosity index improvers, oiliness agents, extreme pressure agents, and solvents and assisting agents such as esters, ketones, alcohols, aldehydes and halogenated or nitrated compounds.

What is claimed is:

1. The method of preparing a mineral oil solution of a metal salt of a phenol sulfide which comprises reacting a phenol sulfide with a basic acting metal compound in the presence of a mineral lubricating oil containing a plasticizing amount of an alkylated phenol containing at least two alkyl groups of branched chain structure, each of which contains from 5 to 16 carbon atoms.

2. A method according to claim 1 in which the metal of the basic acting metal compound is an alkaline earth metal.

3. A method according to claim 2 in which the alkaline earth metal is barium.

4. A method according to claim 1 in which the phonel sulfide is tertiary octyl phenol sulfide.

5. A method according to claim 1 in which the phenol sulfide is tertiary octyl phenol sulfide and in which the metal of the basic acting metal compound is an alkaline earth metal.

6. A method according to claim 5 in which the alkaline earth metal is barium.

7. A method according to claim 1 in which the plasticizer is di-tert.-octylphenol.

8. The method of preparing a mineral oil solution of the barium salt of tertiary octyl phenol sulfide which comprises reacting tertiary octyl phenol sulfide with barium hydroxide in the presence of a mineral lubricating oil containing as a plasticizer at least about 4.0% by weight of di-tert.-octylphenol based on the total reaction mixture.

9. The method of preparing a mineral oil solution of a metal salt of a phenol sulfide which comprises the steps of forming a mixture comprising a phenol sulfide, the mineral lubricating oil, and in the range of about 4 to 20% by weight, based on said mixture, of an alkylated phenol having at least 2 alkyl groups of branched chain structure, each of which contains from 5 to 16 carbon atoms, and adding a basic acting metal compound to said mixture whereby said metal salt is formed.

References Cited in the file of this patent

UNITED STATES PATENTS

| | | |
|---|---|---|
| 2,202,826 | Brandes | June 4, 1940 |
| 2,248,830 | Stillson et al. | July 8, 1941 |
| 2,294,145 | Winning et al. | Aug. 25, 1942 |
| 2,320,263 | Carlson et al. | May 25, 1943 |
| 2,351,347 | Luten | June 13, 1944 |
| 2,430,857 | Borsoff et al. | Nov. 18, 1947 |
| 2,451,345 | McNab et al. | Oct. 12, 1948 |
| 2,480,664 | McNab et al. | Aug. 30, 1949 |
| 2,483,505 | Rogers et al. (I) | Oct. 4, 1949 |
| 2,518,379 | Rogers et al. (II) | Aug. 8, 1950 |
| 2,535,360 | Koch et al. | Dec. 26, 1950 |

OTHER REFERENCES

Morawetz, "Phenolic Antioxidants for Paraffinic Materials," Ind. & Eng. Chem., July 1949, pages 1442–1447.